United States Patent [19]

Horsma et al.

[11] Patent Number: 4,967,176
[45] Date of Patent: Oct. 30, 1990

[54] ASSEMBLIES OF PTC CIRCUIT PROTECTION DEVICES

[75] Inventors: David A. Horsma, Palo Alto; Hundi P. Kamath, Los Altos; Shou-Mean Fang, Union City, all of Calif.

[73] Assignee: Raychem Corporation, Menlo Park, Calif.

[21] Appl. No.: 219,416

[22] Filed: Jul. 15, 1988

[51] Int. Cl.$^5$ .......................... H02H 9/02; H05B 3/12
[52] U.S. Cl. .................................. 338/22 R; 219/553
[58] Field of Search ................ 338/20, 22 R; 219/553

[56] References Cited

U.S. PATENT DOCUMENTS

| | | | |
|---|---|---|---|
| 4,017,715 | 4/1977 | Whitney et al. | 219/505 X |
| 4,177,376 | 12/1979 | Horsma et al. | 219/553 |
| 4,246,468 | 1/1981 | Horsma | 219/553 |
| 4,329,726 | 5/1982 | Middleman et al. | 361/58 |
| 4,346,424 | 8/1982 | Hansen | 361/94 |
| 4,421,582 | 12/1983 | Horsma et al. | 219/553 X |
| 4,574,188 | 3/1986 | Midgley et al. | 338/22 R X |
| 4,764,663 | 8/1988 | Scott | 219/448 |

FOREIGN PATENT DOCUMENTS 2331708A 1/1975 Fed. Rep. of Germany .
2506067A 11/1982 France .

OTHER PUBLICATIONS

"A General Approach to Circuit Design With PolySwitch ® Devices", 1987 Raychem Corporation.
"Protection of Subscriber Line Interface Circuits With PolySwitch ® Devices", 1987 Raychem Corporation.
"Protection of PBX and Key Telephone Systems With PolySwitch Devices", 1987 Raychem Corporation.
"Protection of Loudspeakers With PolySwitch ® Devices", 1987 Raychem Corporation.
"Protection of Telecommunications Networks With PolySwitch Devices", 1987 Raychem Corporation.
"Protection of Batteries With PolySwitch Devices", 1987 Raychem Corporation.

Primary Examiner—Donald A. Griffin
Attorney, Agent, or Firm—Marguerite E. Gerstner; Timothy H. P. Richardson; Herbert G. Burkard

[57] ABSTRACT

A device assembly in which a plurality of PTC circuit protection devices are connected in series. Assemblies of this type are useful in providing protection under voltage conditions which would be unsafe for an individual protection device. In a preferred system the device assembly is connected in series with a circuit breaker.

9 Claims, 2 Drawing Sheets

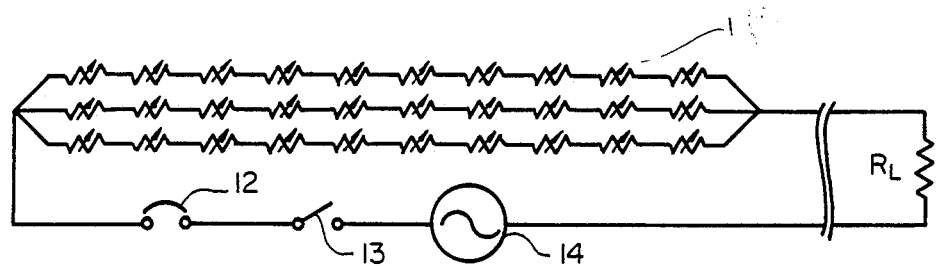
FIG_1
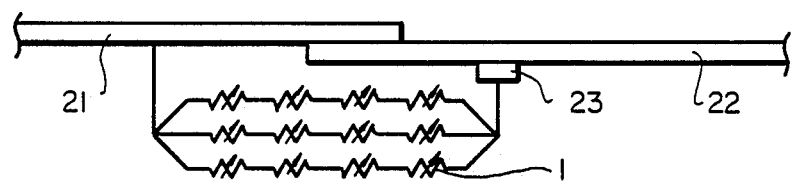
FIG_2A
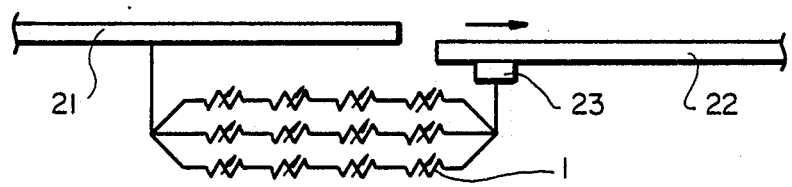
FIG_2B
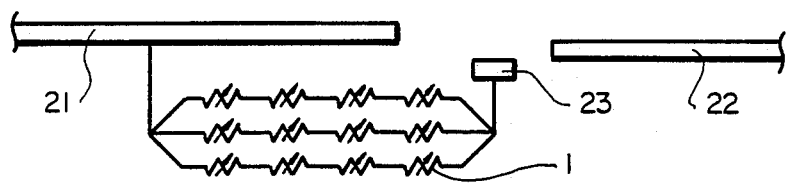
FIG_2C

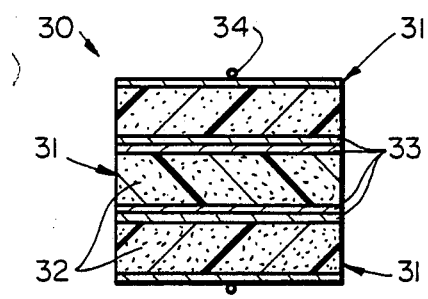
FIG_3
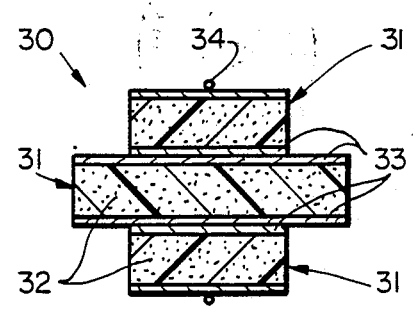
FIG_4
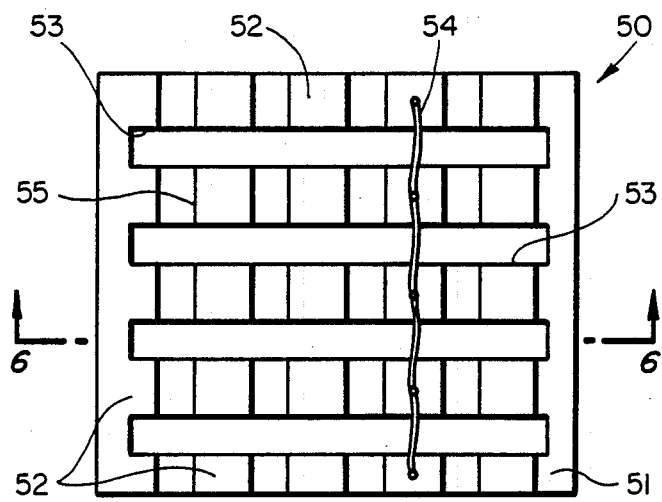
FIG_5
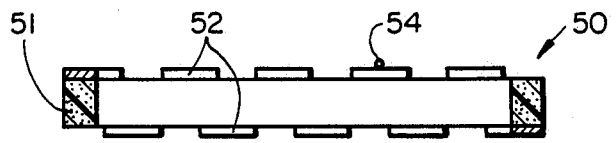
FIG_6

ASSEMBLIES OF PTC CIRCUIT PROTECTION DEVICES

BACKGROUND OF THE INVENTION

1. Field of the Invention

This invention relates to electrical devices comprising PTC materials.

2. Background of the Invention

There are a number of known materials whose resistivity increases sharply with temperature over a relatively small temperature range. Such materials are said to be "PTC materials" or to "exhibit PTC behavior", PTC being an abbreviation of "positive temperature coefficient". For many purposes, it is preferred that a PTC material should exhibit an $R_{14}$ value of at least 2.5 and/or an $R_{100}$ value of at least 10, and particularly preferred that it should have an $R_{30}$ value of at least 6, where $R_{14}$ is the ratio of the resistivities at the end and the beginning of a 14° C. range, $R_{100}$ is the ratio of the resistivities at the end and the beginning of a 100° C. range, and $R_{30}$ is the ratio of the resistivities at the end and the beginning of a 30° C. range. Many PTC materials show increases in resistivity which are very much greater than these minimum values. A plot of the log of the resistance of a PTC element (i.e. an element composed of a PTC composition) against temperature will often show a sharp change in slope over a part of the temperature range in which the composition has an $R_{100}$ value of at least 10. The term "switching temperature" (usually abbreviated $T_s$) is used herein to denote the temperature at the intersection point of extensions of the substantially straight portions of such a plot which lie either side of the portion showing the sharp change in slope. The term "peak resistivity" is used herein to denote the maximum resistivity which the composition exhibits above $T_s$, and the term "peak temperature" is used to denote the temperature at which the composition has its peak resistivity.

PTC elements have proved particularly useful as components of self-regulating heaters and of circuit protection devices. The PTC materials which have been used or proposed for use in such electrical devices are certain ceramics and certain conductive polymers, the term "conductive polymer" being used herein to denote a composition which comprises an organic polymer (this term being used to include polysiloxanes) and, dispersed or otherwise distributed in the organic polymer, a particulate conductive filler. Suitable ceramic materials include doped barium titanates, and suitable conductive polymers include crystalline polymers having carbon black dispersed therein. PTC ceramics generally exhibit a sharp change in resistivity at the Curie point of the material, and PTC conductive polymers generally exhibit a sharp change in resistivity over a temperature range just below the crystalline melting point of the polymeric matrix. The PTC ceramics which are used in commercial practice generally show a sharper rate of increase in resistivity than do the PTC conductive polymers. PTC ceramics generally have a resistivity of at least 30 ohm-cm at 23° C., whereas PTC conductive polymers can have a lower resistivity at 23° C., e.g. down to about 1 ohm-cm or lower. PTC ceramics tend to crack and thus to fail suddenly if exposed to excessive electrical stress, whereas PTC conductive polymers tend to degrade relatively slowly. Conductive Documents which disclose circuit protection devices comprising PTC conductive polymers include the comprising PTC conductive polymers include and the trade pamphlets published by Raychem Corporation in January 1987 and entitled "A General Approach to Circuit Design with PolySwitch Devices", "Protection of Subscriber Line Interface Circuits with PolySwitch Devices", "Protection of PBX and Key Telephone Systems with PolySwitch Devices", "Protection of Telecommunications Networks with PolySwitch Devices", "Protection of Loudspeakers with PolySwitch Devices", and "Protection of Batteries with PolySwitch Devices". ("PolySwitch" is a registered trademark of Raychem Corporation.) The disclosure of each of these trade pamphlets is incorporated herein by reference.

The term "hold current" (or "pass current") is used to denote the maximum steady current which can be passed through a PTC circuit protection device without causing it to trip (i.e. be converted into a high temperature, high resistance state such that the circuit current is reduced to a very low level). The hold current of a device depends upon the rate at which heat is lost from the device; for example, the higher the ambient temperature, the higher the hold current. It is known to connect a plurality of substantially identical devices in parallel to provide a PTC protection assembly having a hold current which is substantially equal to the sum of the hold currents of the individual devices. The performance characteristics of a PTC circuit protection device depend importantly on the voltage which is dropped across it in the tripped state; the higher the voltage, the greater the danger that the device will be damaged and will thus fail to provide the desired protection and/or will fail in a hazardous way, e.g. will explode or burn. As is apparent from the patents and applications incorporated herein by reference, much effort has been devoted to increasing the voltage which can safely be dropped over PTC conductive polymer circuit protection devices. In general, the greater the distance between the electrodes, and the greater the extent of the crosslinking of the conductive polymer, the higher the voltage which can be employed. While there are available protection devices which can safely handle a voltage of about 600 volts RMS, protection against higher voltages remains a problem. Another unsolved problem is the provision of devices which will protect against voltages that can be handled by existing devices, but which are easier to manufacture than existing devices (e.g. require less or no crosslinking) and/or which have a more convenient shape (the shape often being largely determined by the configuration and separation of the electrodes), either for installation or in use (e.g. on a printed circuit board or in other situations where space is at a premium) and/or for thermal balance considerations.

SUMMARY OF THE INVENTION

As noted above, it is known to connect a plurality of substantially identical PTC protection devices in parallel in order to provide a protection assembly having a hold current substantially equal to the sum of the hold currents of the individual devices. It is not known, however, to connect a plurality of PTC protection devices in series in order to provide an assembly which can safely handle a voltage higher than can be handled by any of the devices individually. The reason for this is as follows. Theoretical considerations make it clear that this desirable result should be achieved by a plurality of series-connected devices which are precisely identical and which are in precisely identical thermal environments. However, those skilled in the art have held the belief that this desirable result would never in fact be achieved because it is not in practice possible to make devices which are precisely identical or to place them in precisely identical thermal environments, and because even the smallest difference, under fault conditions, would cause a single one of the devices to increase in resistance much more rapidly than the others and thus to shoulder the whole of the voltage burden. Consequently, those skilled in the art have believed that the ability of a number of devices, connected in series, to control excessive current is no greater than the ability of the single device which trips.

We have discovered that there are many circumstances in which this belief is not justified. In particular, we have discovered that if due account is taken of the dynamic variables during the tripping process (e.g. the rate of change of the current, the rate of change of resistivity with temperature, and the rate at which heat is removed from the devices, including in some cases transfer of heat between devices), the electrical stress can be shared between the devices. In some cases, the sharing of the electrical stress will last only for a limited time, and maintenance of the fault condition which caused tripping will result in substantially all of the electrical stress being concentrated on a single device. In some such cases, this is a satisfactory outcome because the single device, having been converted into the tripped condition over a substantially longer time period because of the temporary sharing of the electrical stress, can safely handle the voltage which is being dropped over it in the steady state condition. In other such cases, this is not true, but the time during which electrical stress is shared is nevertheless highly significant because it is long enough to allow another desired change (e.g. the making or breaking of a contact) to take place under conditions which are substantially less severe than they would otherwise be, for example if only one or a lesser number of protection devices had been present. Providing such other change (a) takes place before there is an excessive electrical stress on the device which is bearing the greatest share of the stress and (b) interrupts the circuit (or otherwise prevents the exertion of excessive stress on that device), then the series of devices will safely handle a substantially higher voltage than any one of the devices alone. In other cases, the electrical stress is also shared in the steady state condition, with more than one of the protection devices being in a tripped condition; in some cases one or more of the tripped devices is also in a latched condition (i.e. the device remains in the high resistance state even if the fault condition is removed, unless power is removed from the circuit).

One very valuable use of this discovery is in circuit protection applications wherein a plurality of PTC protection devices are connected in series to form a device assembly. The device assembly can be used on its own, if it will withstand the electrical stress exerted on it when a fault condition occurs. Alternatively, the assembly can be used in conjunction with a circuit breaker. In the latter embodiment, the device assembly holds and controls the excessive current for a period of time which is short but which nevertheless substantially reduces the electrical stress on the circuit breaker, whose cost and complexity can, therefore, be substantially reduced.

Another very valuable use of this discovery is in switching apparatus which incorporates a device assembly comprising a plurality of PTC protection devices connected in series. The device assembly is preferably connected in series between the terminals (which are being separated or engaged) during the switching operation but is disconnected when the switch is fully open and is disconnected or connected in parallel when the switch is fully closed. In this way, the device assembly controls the current during the critical period while the terminals are being separated or engaged, and reduces the danger that an arc will be struck between the terminals.

BRIEF DESCRIPTION OF THE DRAWING

The invention is illustrated in the accompanying drawing, in which

FIG. 1 is a circuit diagram of the use of the invention for circuit protection,

FIGS. 2A, 2B and 2C are diagrammatic representations of successive stages of operation of a switch making use of the invention as the switch is opened, FIGS. 3 and 4 are cross-sections of composite device assemblies of the invention, FIG. 5 is a plan view of another composite device assembly of the invention, and FIG. 6 is a cross-section on line 6—6 of FIG. 5.

DETAILED DESCRIPTION OF THE INVENTION

The number of protection devices which are connected in series is generally at least three, preferably at least five, and can be many more, e.g. up to 100. The devices will often all be devices which have been made by the same manufacturing process. However, this is not necessary. In general, when using devices which have been rated for use up to a particular voltage (A volts), and the voltage across the assembly in the fault condition is B volts, the number of devices connected in series will be B/A. However, since the rating is generally a conservative one, a number of devices which is less than B/A can be used, particularly when a large number of devices are employed. It is of course important to ensure also that the hold current of the device assembly is sufficiently high, and for this purpose a plurality of sets of devices in series can be placed in parallel with each other. For example a device assembly for protecting a 6KV 600 amp circuit might comprise 600 sets, connected in parallel, each set being made up of ten 600 volt 1 amp protection devices.

The device assembly can be operated under adiabatic conditions, or can be such that heat is transferred between the devices during the tripping operation. For example, the devices can be separated from each other, e.g. by an inert insulating liquid, or (particularly when laminar devices are employed) can be stacked one on top of the other or secured to a thermally conductive substrate.

The invention is illustrated in the drawing in which FIG. 1 is a circuit diagram in which a device assembly 1 is connected in series with a circuit breaker 12, a switch 13, a source of power 14 and a load $R_L$.

FIG. 2 shows the sequential opening of a switch which comprises a stationary portion 21 and a slidable portion 22. Electrical connection from the device assembly 1 is made through stationary terminal 23. When the switch is closed (FIG. 2A), terminal 23 is in physical contact with slidable portion 22. When a specific event (e.g. a voltage surge) occurs, the contact is broken between the portions of the switch, and slidable portion 22 moves away from stationary portion 21 (FIG. 2B). When the switch is completely open, the terminal 23 is physically separated from the slidable portion 22 of the switch (FIG. 2C).

FIGS. 3 and 4 show cross-sectional views of composite device assemblies 30 of the invention. Each assembly shown comprises three devices 31 which are adjacent to, and electrically in series with, one another. The devices comprise a PTC element 32 and two electrodes 33, although in some embodiments in which the devices are in physical and thermal contact, some or all of the devices need have only a single electrode. Electrical leads 34 are attached to the opposite faces of the assembly stack in order to make electrical connection to a power supply or circuit. The assembly of FIG. 3 comprises devices of the same size, although, as shown in FIG. 4, devices of different sizes and/or comprising compositions of different resistivities may be used.

FIG. 5 is a plan view of a composite device assembly 50. A substrate 51 which comprises a PTC composition is laminated, printed, or otherwise supplied with metal electrode strips 52. Slots 53 may be machined or etched through the thickness of the PTC substrate and lead wire 54 may be attached to individual devices 55 in order to produce the desired series/parallel configuration.

FIG. 6 shows a cross-sectional view on line 6-6 of FIG. 5 in which the PTC substrate 51 comprises a conductive polymer.

EXAMPLES

The invention is illustrated by the following examples.

Example 1

A conductive polymer composition was prepared by mixing the following ingredients (by volume) in a Banbury mixer: 56.7% high density polyethylene (Marlex 6003, available from Phillips Petroleum), 25.1% carbon black (Sterling SO, available from Cabot), 16.5% silane-coated alumina trihydrate (Solem 916SP, available from J. M. Huber), and 1.7% antioxidant (an oligomer of 4,4-thio bis(3-methyl 1-6-t-butyl phenol) as described in U.S. Pat. No. 3,986,981). Using a Brabender crosshead extruder fitted with a dogbone-shaped die, pellets of the composition were melt-extruded around two 20 AWG 19/32 nickel-coated copper wires which had been coated with a graphite/silicate composition (Electrodag 181, available from Acheson Colloids). The extrudate was cut into pieces, and the conductive polymer was removed from part of the device to expose the electrodes. The devices were heat-treated at 150° C. in nitrogen for one hour, irradiated with a 1.5 MeV electron beam to a dose of 20 Mrad, heat-treated a second time, irradiated to a dose of 150 Mrad, and heat-treated a third time. After processing, the devices had a resistance of 16.5 to 18.5 ohms and had maximum voltage and current ratings of 600 volts and 1 amp, respectively.

Ten devices were electrically connected in series and were then inserted into a beaker which was filled with a thermally dissipating liquid (Fluorinert FC-75, available from DuPont). The beaker was placed in a water bath heated to 100° C. and the devices were allowed to equilibrate to the temperature. The devices were connected to a series ballast resistance of 500 ohms and were then powered at 6000 volts/2 amps rms for a period of 0.4 seconds. The voltage and current were monitored with an oscilloscope during the test, and the resistance of each device was measured at the start and conclusion of the test. The oscilloscope traces indicated that the devices which tripped did so within three AC cycles.

The resistances for three different experimental groups of ten devices are listed in Table I. Those devices which did not trip during the test are indicated by an asterisk (*). When the ratio of resistance after the test ($R_f$) to initial resistance ($R_i$) was greater than 1.2, the device was deemed to have tripped; those between 1.10 and 1.19 did not completely trip. During each test, 50 to 70% of the devices tripped.

TABLE I

| Device No. | 1 | 2 | 3 | 4 | 5 | 6 | 7 | 8 | 9 | 10 |
|---|---|---|---|---|---|---|---|---|---|---|
| Group 1: | | | | | | | | | | |
| $R_i$ (ohms) | 17.6 | 17.2 | 17.3 | 18.5 | 17.6 | 16.9 | 17.8 | 17.3 | 17.2 | 17.6 |
| $R_f$ (ohms) | 17.9 | 24.1 | 23.8 | 22.7 | 23.4 | 17.2 | 24.3 | 17.7 | 17.3 | 18.0 |
| $R_f/R_i$ | 1.02* | 1.40 | 1.38 | 1.33 | 1.02* | 1.37 | 1.02* | 1.02* | 1.01* | 1.02* |
| Group 2: | | | | | | | | | | |
| $R_i$ (ohms) | 17.0 | 16.5 | 17.2 | 17.5 | 17.6 | 16.7 | 17.4 | 16.7 | 17.0 | 17.5 |
| $R_f$ (ohms) | 18.7 | 18.3 | 18.0 | 22.7 | 24.2 | 25.5 | 25.1 | 25.6 | 18.1 | 18.1 |
| $R_f/R_i$ | 1.10* | 1.11* | 1.05* | 1.30 | 1.38 | 1.53 | 1.44 | 1.53 | 1.06* | 1.03* |
| Group 3: | | | | | | | | | | |
| $R_i$ (ohms) | 16.8 | 17.0 | 16.6 | 17.7 | 18.4 | 18.1 | 17.4 | 17.2 | 18.3 | 18.5 |
| $R_f$ (ohms) | 24.0 | 23.1 | 18.8 | 25.3 | 24.8 | 27.0 | 25.9 | 18.1 | 24.0 | 18.8 |
| $R_f/R_i$ | 1.43 | 1.36 | 1.113* | 1.43 | 1.35 | 1.44 | 1.49 | 1.05* | 1.31 | 1.02* |

Example 2

A conductive polymer composition with a resistivity of about 4 ohm-cm was prepared by mixing 56.1 vol% high density polyethylene (Marlex HXM 50100, available from Phillips Petroleum) 26.7 vol% carbon black (statex G, available from Columbian Chemicals), 15.5 vol% magnesium hydroxide (Kisuma 5A, available from Kisuma), and 1.7 vol% antioxidant (as described in Example 1) in a Banbury mixer. Pellets of the composition were extruded to produce a sheet with a thickness of 0.040 inch (0.10 cm). After laminating the sheet on each side with electrodeposited nickel foil electrodes (available from Fukuda), the sheet was irradiated to a dose of 10 Mrad. Devices with a diameter of 0.360 inch (0.914 cm) and a resistance of 0.66 ohms were cut from the plaque. Each device was nominally capable of withstanding 60 volt/40 amp electrical powering. Three devices were stacked together and two metal leads were soldered to the top and bottom surfaces of the stack. During the lead attachment process, solder stuck to the exposed edges of the electrodes of each of the three devices, fusing the devices together to give a composite device assembly with a resistance of 2.56 ohms. When tested under 600 volt/1 amp impulse conditions, the composite device assembly survived 12 to 18 seconds before failing. When tested at 300 volts/1 amp, the composite device assembly tripped in less than 17 seconds and survived 132 test cycles. Under conventional testing, the individual devices comprising the composite device assembly would not survive voltage impulses of 300 to 600 volts.

Example 3

Five devices as described in Example 2 were stacked to produce a composite device assembly with a resistance of 3.94 ohms. When tested at 600 volts/1 amp, the composite device assembly survived 17 seconds before tripping. When tested at 300 volts/1 amp, the composite device assembly survived 145 cycles.

Example 4

A conductive polymer composition with a resistivity of about 1 ohm-cm was prepared by mixing 65.8 vol% high density polyethylene (Marlex 6003, available from Phillips Petroleum) with 34.2 vol% carbon black (Raven 600, available from Columbian Chemicals) in a Banbury mixer. The composition was extruded, laminated with metal foil, and irradiated as described in Example 2. Two devices with a diameter of 0.360 inch (0.91 cm) and a resistance of 0.148 ohm were cut from the laminated sheet. Using the procedure of Example 2, these devices were positioned on either side of a device as described in Example 2 to produce a composite device assembly with a resistance of 1.185 ohms. When tested at 600 volts/1 amp, the composite device assembly survived 45 seconds before tripping. At 300 volts/1 amp (power applied for 40 seconds), the composite device assemblies survived 145 cycles.

Example 5

A device as described in Example 2 (diameter 0.360 inch) was sandwiched between two devices with a diameter of 0.250 inch (0.64 cm) cut from the sheet described in Example 4 to produce a composite device assembly with a resistance of 2.1 ohms. When powered at 600 volts/1 amp, the composite device assembly tripped in 11 seconds. At 300 volts/ 1 amp/40 sec, the composite device assemblies survived 20 to 120 cycles.

We claim:

1. A device assembly which comprises at least three circuit protection devices connected in series, each of said devices comprising a laminar PTC element which is sandwiched between two laminar metal electrodes, the PTC elements being stacked on top of each other but separated by laminar metal electrodes.

2. An assembly according to claim 1 wherein each of the PTC elements is composed of a conductive polymer.

3. A device assembly which comprises a plurality of sets of PTC circuit protection devices connected in series, the sets being connected in parallel with each other.

4. An assembly according to claim 3 wherein each of the sets is substantially identical.

5. An electrical circuit breaking system which comprises
   (1) a circuit breaker, and
   (2) a device assembly which is connected in series with the circuit breaker and which comprises at least five PTC elements which
      (a) are connected in series,
      (b) have been manufactured by the same process, and 6. A system according to claim 5 wherein each of the PTC elements is composed of a material which exhibits PTC behavior with an $R_{30}$ value of 100 to 10,000.

7. A system according to claim 5 wherein the PTC element is composed of a conductive polymer composition.

8. An electrical switching system which has a closed configuration, an intermediate configuration, and an open configuration, and which comprises
   (1) a first metal contact surface,
   (2) a second metal contact surface, and
   (3) a device assembly which comprises at least three PTC elements which
      (a) are connected in series, and
      (b) have been made by the same manufacturing process,
   the first and second surfaces being in direct physical contact when the system is in the closed configuration; the first and second surfaces being physically separated from each other but electrically connected to each other through the device assembly when the system is in the intermediate configuration; and the first and second surfaces being physically and electrically separated from each other when the system is in the open configuration.

9. A system according to claim 8 wherein each of the PTC elements is composed of a conductive polymer.

* * * * *